United States Patent
Liu et al.

(10) Patent No.: US 9,001,817 B2
(45) Date of Patent: Apr. 7, 2015

(54) METHOD AND SYSTEM FOR MAINTAINING WIRELESS LINKS IN A COMMUNICATION NETWORK

(75) Inventors: Chunmei Liu, Great Falls, VA (US); Masoud Olfat, Great Falls, VA (US); Nagi Mansour, Arlington, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 654 days.

(21) Appl. No.: 12/835,284

(22) Filed: Jul. 13, 2010

(65) Prior Publication Data

US 2012/0014489 A1    Jan. 19, 2012

(51) Int. Cl.
*H04J 3/06* (2006.01)
*H04W 56/00* (2009.01)
*H04W 52/02* (2009.01)
*H04W 74/08* (2009.01)

(52) U.S. Cl.
CPC .......... *H04W 56/00* (2013.01); *H04W 52/0225* (2013.01); *H04W 74/0833* (2013.01)

(58) Field of Classification Search
USPC ........................................................ 370/350
See application file for complete search history.

(56) References Cited

U.S. PATENT DOCUMENTS

| | | | |
|---|---|---|---|
| 7,814,218 B1 * | 10/2010 | Knee et al. | 709/230 |
| 2005/0114542 A1 * | 5/2005 | Hodges et al. | 709/237 |
| 2006/0166688 A1 * | 7/2006 | Sun et al. | 455/502 |
| 2006/0195767 A1 * | 8/2006 | Ihm et al. | 714/776 |
| 2007/0066275 A1 * | 3/2007 | Nagy et al. | 455/403 |
| 2008/0123576 A1 * | 5/2008 | Son et al. | 370/311 |
| 2010/0184446 A1 * | 7/2010 | Moon et al. | 455/450 |
| 2010/0226342 A1 * | 9/2010 | Colling et al. | 370/336 |
| 2010/0309929 A1 * | 12/2010 | Gao et al. | 370/458 |
| 2011/0058529 A1 * | 3/2011 | Uemura | 370/331 |

* cited by examiner

*Primary Examiner* — Ayaz Sheikh
*Assistant Examiner* — Hai-Chang Hsiung

(57) ABSTRACT

A method of operating a communication system comprises sending a frame by an access node to a wireless device where the frame comprises a packet. A counter is initialized and a timer for each frame is initiated. The method continues with the access node determining if a response associated with the packet is received before the expiration of the timer. If the response is received prior to the expiration of the timer, the counter and the timer are reset. If a response is not received prior to the expiration of the timer, the counter is incremented. Upon the counter meeting a criteria of a certain quantity of lost packets, the access node performs a synchronization process.

14 Claims, 6 Drawing Sheets

METHOD AND SYSTEM FOR MAINTAINING WIRELESS LINKS IN A COMMUNICATION NETWORK

TECHNICAL BACKGROUND

Wireless networks commonly perform multiple processes when establishing communication sessions with wireless devices. These processes may be referred to as network entry processes. One such process is sometimes referred to as a ranging process or random access channel (RACH) process. Ranging between the wireless network and a wireless device allows the wireless device to synchronize the uplink (UL) connection with the network by maintaining timing, frequency and power-levels for the UL connection.

Wireless communication devices commonly communicate at various layers with wireless communication networks. Links established at lower layers allow communications to commence at upper layers. The failure of a lower layer link may cause the failure of upper layer links.

In many cases, wireless links may degrade due to various factors or conditions. For example, the wireless link may experience fading due to the mobility of the wireless device or the over-the-air conditions that exist at a particular point in time. Such a degradation of a wireless link may cause upper layer links, such as a network connection, to fail. In some instances, the network may not know that the link to a particular wireless device has failed and the network may needlessly continue to send data destined for the wireless device, wasting valuable network resources.

One aspect that affects user experiences and device performance is the link status between a wireless device and the network. Maintaining proper link quality reduces delay and latency and improves user experiences. In contrast, when a device is not have properly adjusted wireless links with a network, fundamental operations can be inhibited.

OVERVIEW

A method of operating a communication system comprises sending a frame by an access node to a wireless device where the frame comprises a packet. A counter is initialized and a timer for each frame is initiated. The method continues with the access node determining if a response associated with the packet is received before the expiration of the timer. If the response is received prior to the expiration of the timer, the counter and the timer are reset. If a response is not received prior to the expiration of the timer, the counter is incremented. Upon the counter meeting a criteria of a certain quantity of lost packets, the access node performs a synchronization process.

Another method of operating a communication system is also provided. A communication transmission is initiated from an access node to a wireless device. A frame that includes a packet that requires a response is sent by the access node to the wireless device. A counter is initialized and a timer for each frame is initiated. The method continues with the access node determining if the response associated with the packet is received before the expiration of the timer. If the response is received prior to the expiration of the timer, the counter and the timer are reset. If a response is not received prior to the expiration of the timer, the counter is incremented. Upon the counter meeting a criteria of a certain quantity of lost packets, the access node performs a synchronization process and stops the communication transmission to the wireless device.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
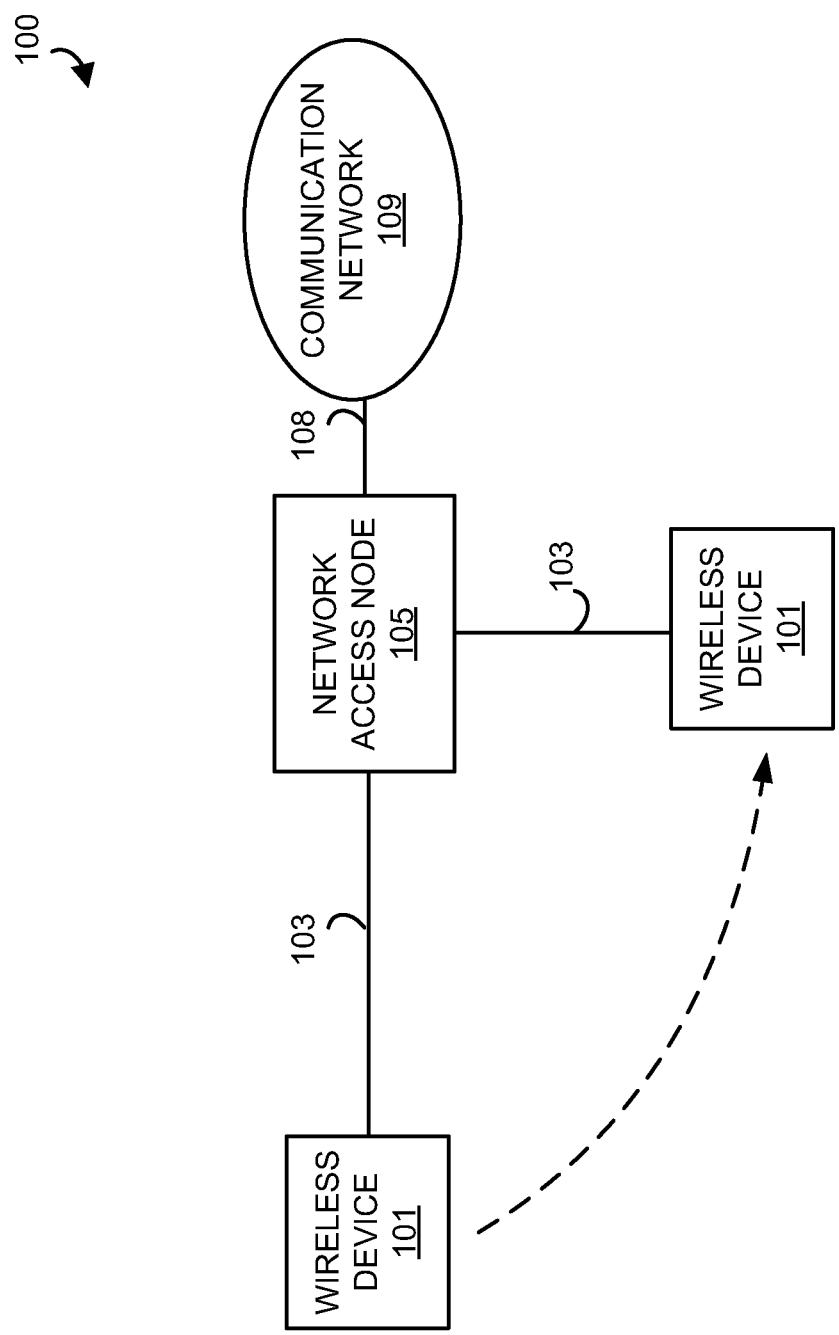
FIG. 1 is a block diagram illustrating a wireless communication system.

FIG. 1 illustrates communication system 100. Communication system 100 includes wireless device 101, network access node 105, and communication network 109. Wireless device 101 and network access node 105 communicate over wireless link 103. Network access node 105 and communication network 109 communicate over communication link 108.

Figure 2:
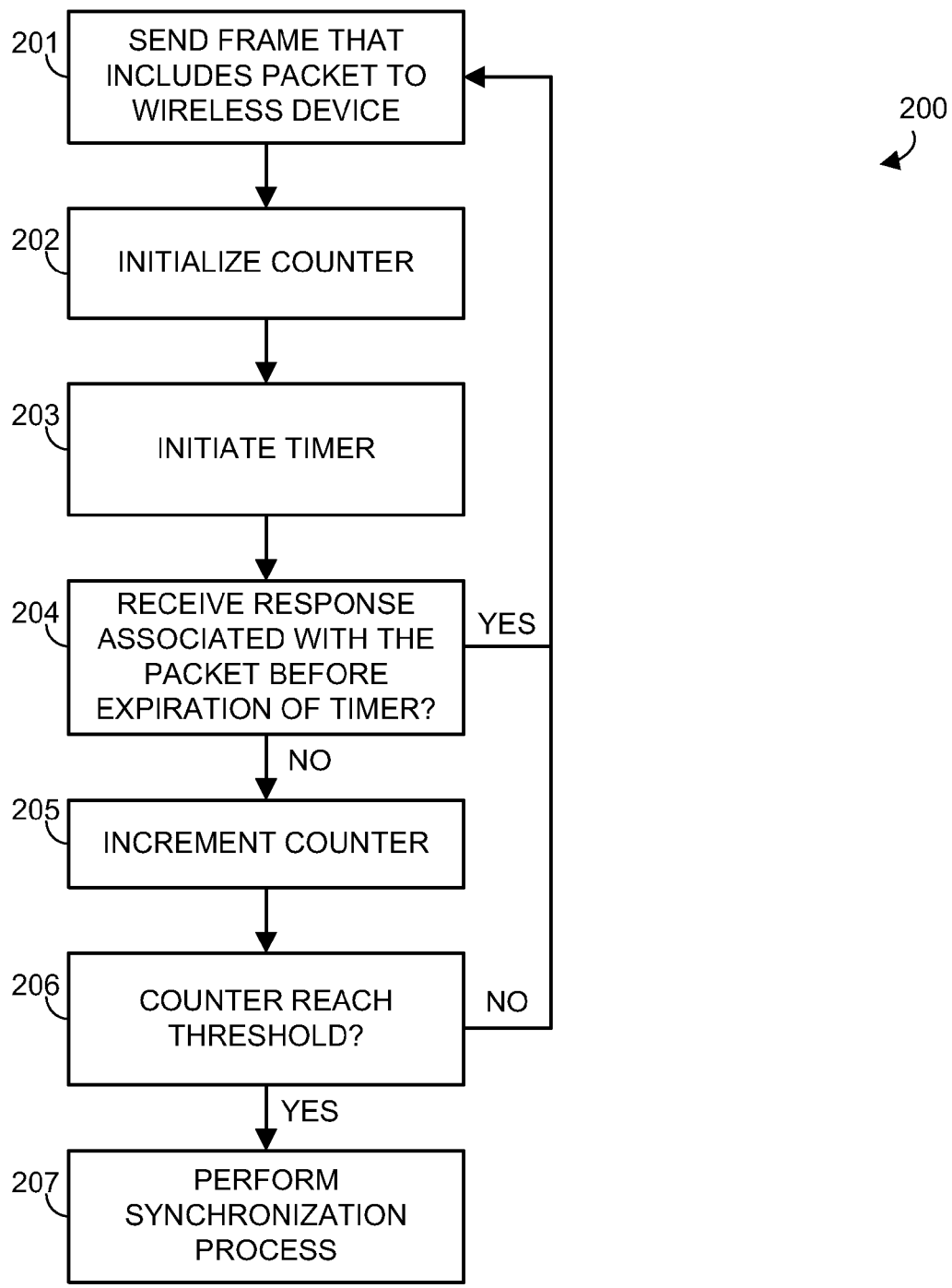
FIG. 2 is a flow diagram illustrating the operation of the wireless communication system.

FIG. 2 illustrates process 200 describing the operation of communication system 100. Network access node 105 sends a frame that includes a packet to wireless device 101 (Step 201). If a response by wireless device 101 is required for the packet, a counter is initialized and a timer is initiated (Steps 202 & 203). If a response associated with the packet is received before the expiration of the timer, the process 200 begins again (Step 204).

If a response is not received at network access node 105 before the expiration of the timer, the counter is incremented (Step 205). When the counter reaches a threshold, network access node 105 performs a synchronization process (Steps 206 & 207).

The synchronization process allows wireless device 101 to adjust its UL (uplink) timing and power control levels with network access node 105 over wireless link 103. In some examples, the UL synchronization process may be referred to as a ranging process or random access channel (RACH) process for establishing initial UL transmissions over wireless link 103.

Referring back to FIG. 1, wireless device 101 is any device capable of communicating wirelessly with network access node 105. Wireless device 101 comprises communication interface and processing elements configured to operate as described herein for wireless device 101. Communication interface elements may include an antenna (or antennas) coupled to Radio Frequency (RF) communication circuitry that processes RF signals received over the antenna. The RF communication circuitry typically includes at least an amplifier, filter, modulator, and signal processing circuitry. Wireless device 101 may also include a user interface, memory device, software, processing circuitry, or some other communication components. Wireless communication device 101 may be a phone, computer, e-book, mobile Internet appliance, wireless network interface card, media player, game console, or some other wireless communication apparatus—including variations or combinations thereof.

Network access node 105 comprises RF communication circuitry and an antenna. The RF communication circuitry typically includes an amplifier, filter, RF modulator, and signal processing circuitry. Network access node 105 may also comprise a router, server, memory device, software, processing circuitry, cabling, power supply, network communication interface, structural support, or some other communication apparatus. Network access node 105 could be a base station, Internet access node, telephony service node, wireless data access point, or some other wireless communication system—including variations or combinations thereof.

Communication network 109 comprises any network or collection of networks capable of communicating with network access node 105 over communication link 108. Examples of communication network 109 include a Wide Area Network (WAN), Local Area Network (LAN), internet, intranet, public switch telephone network (PSTN), wireless communication network, cable multi-service operator (MSO) network, or any combination or variation thereof.

Wireless link 103 uses the air or space as the transport media. Wireless link 103 may use various protocols, such as Code Division Multiple Access (CDMA), Evolution Data Only (EVDO), Worldwide Interoperability for Microwave Access (WiMAX), Global System for Mobile Communication (GSM), Long Term Evolution (LTE), Wireless Fidelity (WIFI), High Speed Packet Access (HSPA), or some other wireless communication format.

Communication link 108 uses metal, glass, air, space, or some other material as the transport media. Communication link 108 could use various communication protocols, such as Time Division Multiplex (TDM), Internet Protocol (IP), Ethernet, communication signaling, CDMA, EVDO, WiMAX, GSM, LTE, WIFI, HSPA, or some other communication format—including combinations thereof. Communication link 108 could be a direct link or may include intermediate networks, systems, or devices.

In operation, a user operates wireless communication device 101 to establish communication sessions between wireless device 101 and communication network 109. For example, a user may operate wireless device 101 to place a phone call, check an email account, browse the Internet, or otherwise communicate with a destination via communication network 109.

In order to exchange communications in this manner, wireless communication device 101 first establishes wireless link 103 with network access system 105. Upon establishing wireless link 103, wireless device 101 performs a network entry process to establish an initial network connection with communication network 109. The network entry process may comprise several steps, at the completion of which wireless device 101 is able to exchange communications with communication network 109.

At times, the quality of wireless link 103 may vary. For example, the signal strength of wireless link 103 as measured by wireless device 101 may increase or decrease due to a variety of factors. Fluctuations in signal strength may occur because of mobility of wireless device 101, fast fading, shadow fading, or combinations of these factors. In fact, the quality of wireless link 103 may suffer so greatly that wireless link 103 is dropped, thereby inhibiting wireless device 101 from exchanging communication sessions over the network connection with communication network 109.

Referring to FIG. 1 once again, an example is illustrated showing a possible scenario where packets are lost between network access node 105 and wireless device 101 due to link degradation of link 103 because of the mobile nature of wireless device 101. As wireless device 101 moves from one geographic location to another (as illustrated by the dotted line), link 103 experiences a degradation in signal quality. If the link quality degrades below a certain threshold, packets may be lost that are sent by network access node 105 to wireless device 101. After a certain number of packets are lost as determined by the process illustrated in FIG. 2, network access node 105 invokes the UL synchronization process.

As in other communication systems, state synchronization among different entities in wireless communication systems is important for proper system operations, including state synchronization between a wireless device and a wireless network.

State synchronization means that state information, including the wireless device's operation mode (e.g. active mode or idle mode) as well as context associated with the wireless device, is retained at both ends. Retaining this context information is important because a wireless network's operating behavior towards a wireless device (and vice versa) would be different depending on the knowledge of the overall connection state between them, such as radio link state, whether the device is in idle mode or sleep mode or active mode, and so on. For example, when the wireless device is in idle mode and there is incoming data for the wireless device, the network will page the wireless device. In contrast, when the wireless device is in active mode, the network will simply send packets to the wireless device. Hence, it is essential for the device and the network to maintain and synchronize state information, so that the device and the network can at all times be aware of each other's state.

Improved synchronization between the wireless device and the network will avoid many problems. For example, due to lack of synchronization, when a wireless device experiences a degradation of service over the wireless link, the network may continue to send data destined for the wireless device wasting valuable network resources.

Disclosed herein are mechanisms to provide a wireless network with the status of the wireless link to a wireless device and allow for prompt initiation of link maintenance mechanisms. This will allow the network to maintain and synchronize state information between the wireless device and network to improve network operations and performance.

Figure 3:
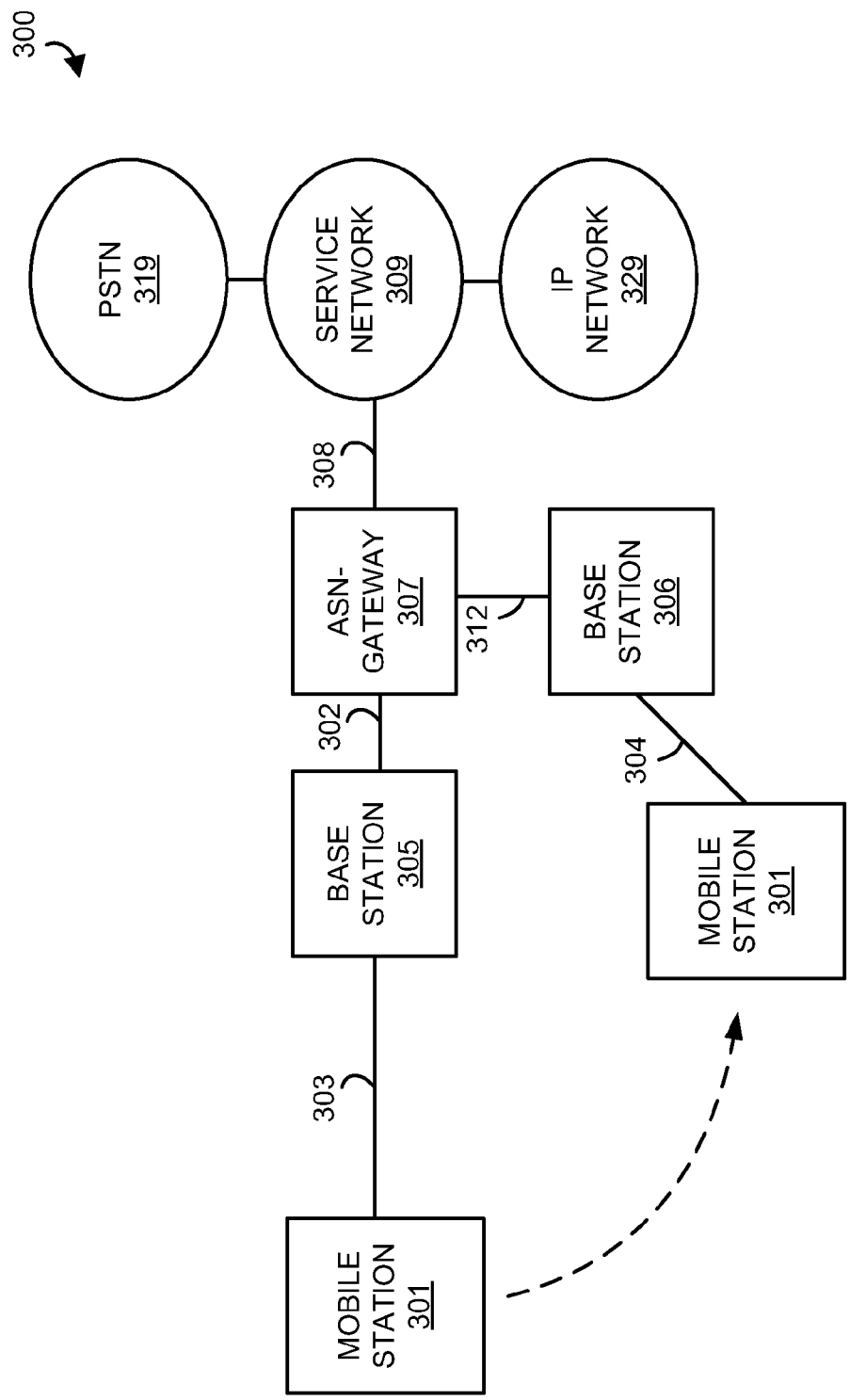
FIG. 3 is a block diagram illustrating a wireless communication system.

FIG. 3 illustrates a network architecture suitable for the WiMAX wireless interface protocol. However, it should be understood that other wireless protocols could be used, as well as other network architectures. Examples of other suitable wireless protocols include WCDMA, CDMA2000, CDMA, EVDO, GSM, LTE, WIFI, and HSPA, as well as other variations and combinations thereof.

Continuing with FIG. 3, communication system 300 is illustrated and includes wireless communication device (wireless device) 301, base station 305, base station 306, access service network (ASN) gateway 307, service network 309, public switched telephone network 319, and Internet Protocol (IP) network 329.

Mobile station 301 and base station 305 communicate over wireless link 303. Base station 305 and access gateway 307 communicate over link 302. Base station system 306 and access gateway system 307 communication over link 312.

Access gateway system 307 and communication network 309 communicate over communication link 308.

Mobile station 301 comprises any device capable of communicating with service network 309 and thus, with PSTN 319 and IP network 329 over a wireless interface with base station systems 305 and 306 over an air interface. Mobile phones, portable computers, mobile media devices, and network interface cards are examples of such devices. Mobile station 301 may sometimes be referred to as a mobile station (MS).

Base stations 305 and 306 provide the wireless interface to mobile station 301, over which mobile station 301 exchanges communications with service network 309. Base stations 305 and 306 provide functions such as mobility management, hand off provisioning and control, radio resource management, quality of service enforcement, and session management, as well as other functions.

ASN gateway 307 provides a traffic aggregation point for base stations 305 and 306. Additional functions may include location management and paging, radio resource management and admission control, subscriber profile management, AAA functionality, and quality of service provisioning and management.

Service network 309 provides mobile station 301 with connectivity to IP network 319, and connectivity to PSTN 319. It should be understood that service network 309 could provide connectivity to other networks as well, such as a 3GPP/3GPP2 network, an intranet, LAN, WAN, public networks, corporate networks, or the like. Service network 309 may include elements such as AAA servers that provide authentication and authorization services to devices, such as mobile station 301. Service network 309 handles IP address management, roaming support, location management, and interworking of communications to formats suitable for other networks, such as PSTN 319.

It should be understood that any of the functions described as pertaining to base stations 305 and 306, ASN gateway 307, or service network 309 could reside in or be performed by any of those elements. In addition, the elements themselves could be combined or otherwise contained within each other. For example, ASN gateway could be contained in or combined with at least one of base stations 305 and 306.

Figure 4:
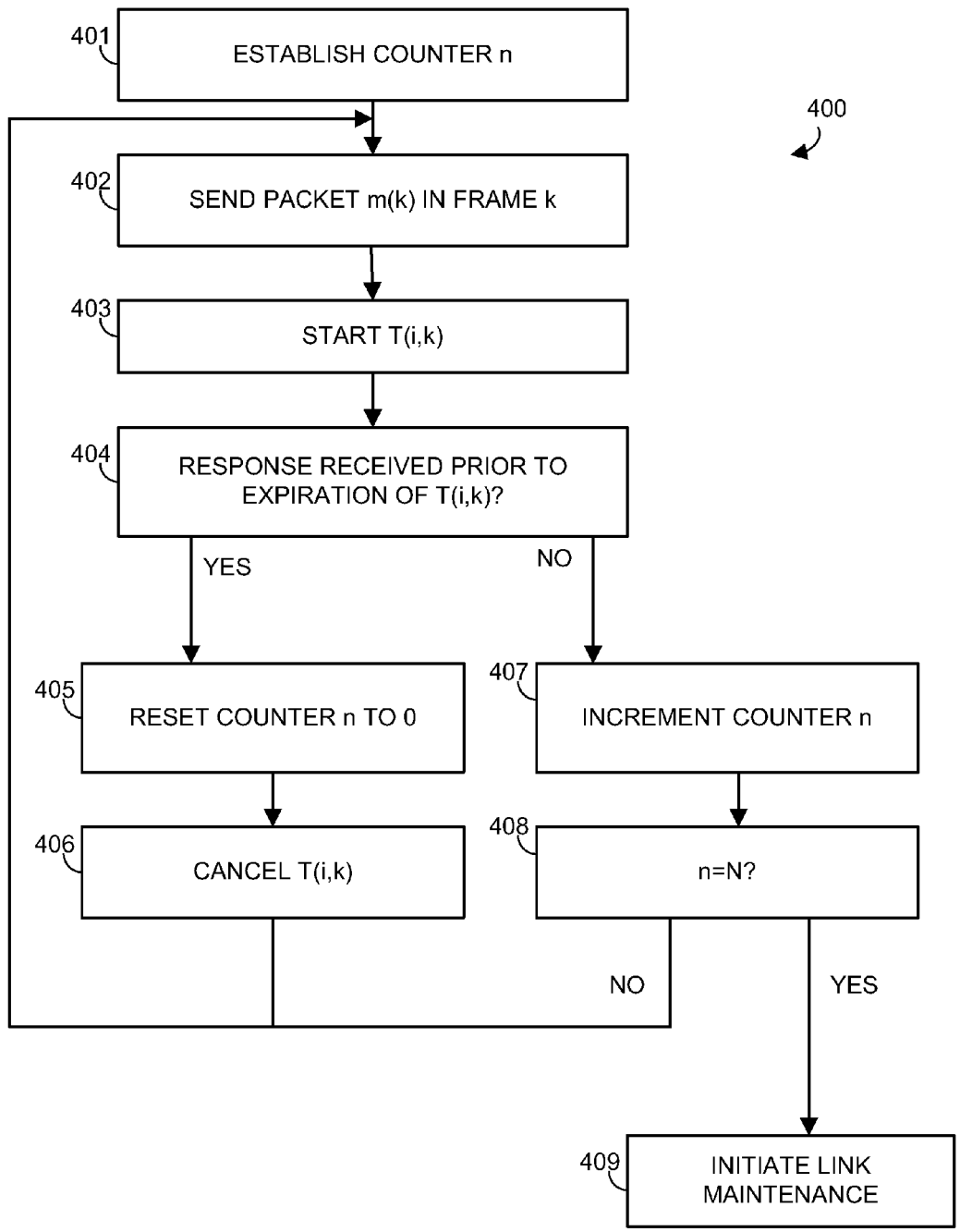
FIG. 4 is a flow diagram illustrating the operation of the wireless communication system.

FIG. 4 is a flow diagram illustrating process 400 that describes the operation of communication system 300 to improve synchronization between mobile stations and base stations. In particular, process 400 provides an example quickly detecting a failed link. This is accomplished by base station 305 counting the number of packets that are in a frame that fail to receive responses from mobile station 301. Upon reaching a certain number of lost packets, base station 305 invokes a link maintenance process.

Referring again to FIG. 3, mobile station 301 has established wireless connection 303 with base station system 305. Wireless connection 303 may be considered a layer 1, or physical layer link. Likewise, mobile station 301 has established a network connection with service network 309 by performing a network entry process. The network entry process may include steps such as scanning for downlink channels, synchronizing with the downlink of a serving base station, obtaining uplink parameters, ranging, negotiating basic capabilities, authorization and key exchange, network registration, obtaining an IP address, obtaining time of day, transferring operational parameters, and establishing provisioned parameters. It should be understood that some steps could be omitted and other, different steps included in a full network entry process.

Mobile station 301 is initially located in a geographic area and exchanges communications over the network connection. The network connection may be considered an upper layer link relative to layer 1 link wireless connection 303. For example, the network connection may be a layer 2 or layer 3 connection.

The communications are exchanged using context information that identifies the network connection. Examples of context information include internet protocol (IP) addresses, media access control (MAC) identifiers, and the like. Establishing the network connection can be referred to as "entering" a service network that provides mobile station 301 with access service. The access service allows mobile station 301 to communicate over service network 309 with destinations in PSTN 319 or IP network 329. For example, a user operating mobile station 301 may place phone calls, browse the worldwide web, check email, or otherwise utilize voice, video, media, or data services provided by service network 309.

Referring now to FIG. 4, during a communication session between mobile station 301 and base station 305, base station 305 maintains a counter, n, for tracking consecutive lost packets (Step 401). Initially, the counter n is set at 0. For each frame k, base station 305 sends $m(k)$ packets to mobile station 301 where packet $i(k)(i(k)=1, 2, \ldots, m(k))$ requires responses from mobile station 301 within time $T(i,k)$ (Steps 402 & 403). Each time a response is received at base station 305, base station 305 resets n to 0, discards any tracking data, restarts the tracking from the next frame (Steps 404, 405, & 406).

If no response is received from mobile station 301 for any of the $m(k)$ packets within the time $T(i,k)$, the counter n is incremented by 1 (Steps 404 & 407). Frames are counted containing packets requiring responses in this fashion until n=N, where N is that largest count of lost packets reasonable for this link and that is negotiated between base station 305 and mobile station 301 (Steps 407 & 408). When n=N, base station 305 invokes the link maintenance mechanisms (Steps 408 & 409) that is initiated by sending an unsolicited RNG-RSP (ranging response) message to mobile station 301.

Retransmissions of the same packet may be considered a new transmission. Additionally, packet the do not require responses from mobile station 301 are not considered when incrementing counter n or initiating timer $T(i,k)$. Messages that are considered for this process may include management messages in addition to data payload messages. Some management messages require responses from mobile station 301 when sent by base station 305. Further, for HARQ packets, both ACK and NACK messages are considered responses from mobile station 301.

Hybrid automatic repeat request (HARQ) is a mechanism in packet networks that provides for error control when sending and receiving packets of data. When a packet is sent, the receiver sends back a HARQ ACK (acknowledgement) or HARQ NACK (negative acknowledgement) message back to the sender to acknowledge the successful or unsuccessful reception of the packet. HARQ is one possible example of packets that require responses from mobile station 301.

It should also be noted that timer $T(i,k)$ may vary for each packet thus resulting in expiration of timers in a different order from when they were sent by base station 305.

Ranging is a link maintenance UL synchronization process utilized in WiMAX and CDMA. Typically, mobile station 301 will initiate the ranging process at the request of base station 305. Initial ranging allows mobile station 301 to obtain the relative timing, frequency, and power-level adjustment required to maintain the UL link with base station 305. Because the quality of wireless link 303 fluctuates, base station 305 will monitor link 303 by periodically performing ranging. As stated above, fluctuations with link 305 may be caused by the mobility of mobile station 301, fast fading, shadow fading, or combinations of these factors.

Referring to FIG. 3 once again, an example is illustrated showing a possible scenario when packets are lost between base station 305 and mobile station 301 due to link degradation of link 303 because of the mobile nature of mobile station 301. As mobile station 301 moves from one geographic location to another (as illustrated by the dotted line), link 303 experiences a degradation in signal quality. If the link quality degrades below a certain threshold, packets may be lost that are sent by base station 305 to mobile station 301. After N number of packets are lost as determined by the process illustrated in FIG. 4, base station 305 invokes the link maintenance mechanisms.

Figure 5:
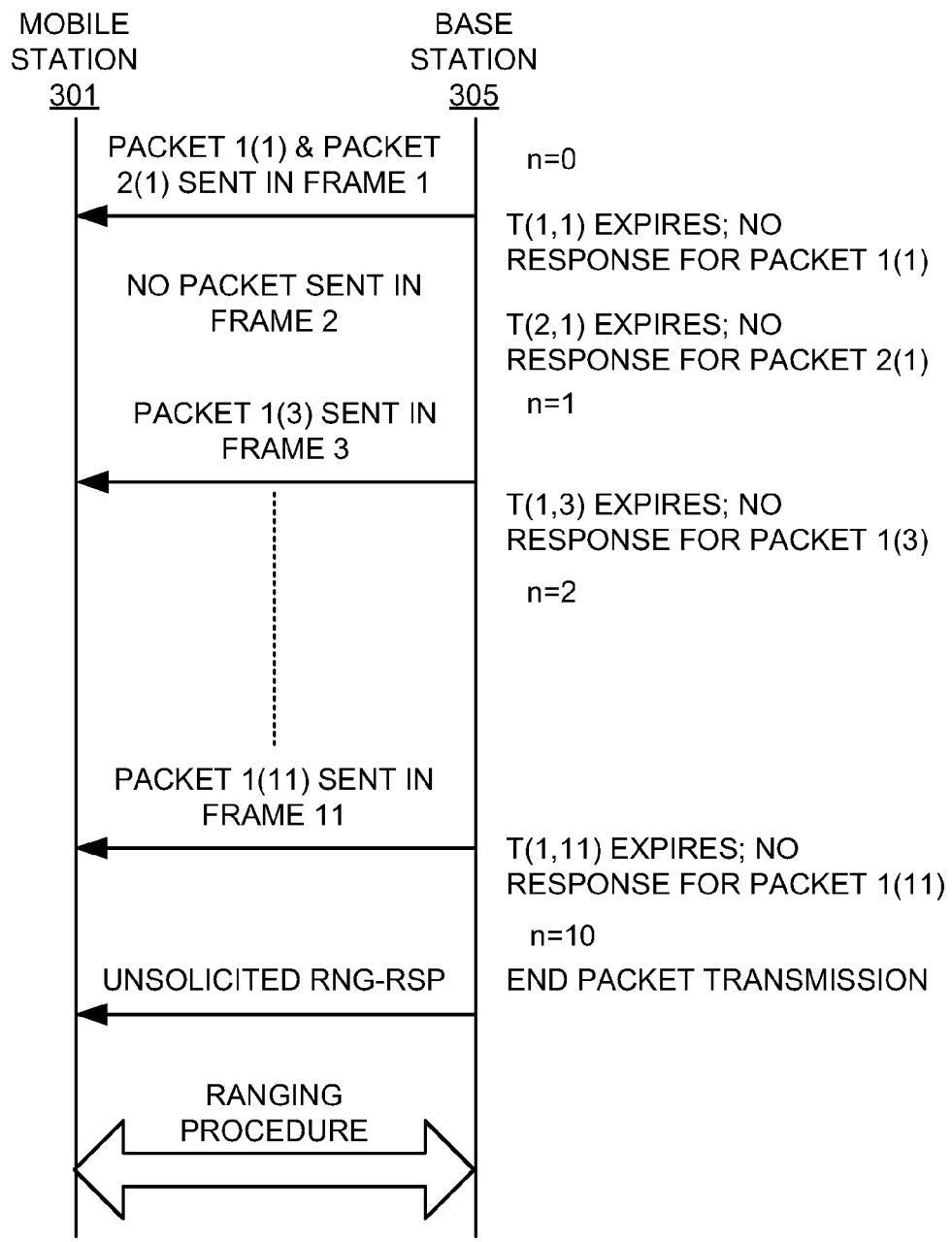
FIG. 5 illustrates an operational flow diagram.

FIG. 5 is an operational flow diagram further illustrating the operation of communication system 300. In FIG. 5, an example is provided where base station 305 initiates a link maintenance process when mobile station 301 fails to respond according to the process illustrated in FIG. 4.

In this example, counter n is set to 0. In frame 1, two data packets 1(1) and 2(1) are sent by base station 305 to mobile station 301. These packets have HARQ employed that requires either an ACK or NAK response from mobile station 301. The timers are set for each packet at T(1,1) and T(2,1) respectively. When there is not a response from mobile station 301 prior to the expiration of the timers T(1,1) and T(2,1), counter n is incremented by 1 and is now set at 1.

In frame 2, there are no packets sent that require a response. Thus, counter n is unaffected and a timer is not initiated. Frame 3 is sent by base station 305 that contains a MAC management message that requires a response from mobile station 301 within time T(1,3). When no response is received, counter n is incremented by 1 and is now set at 2. Packets requiring responses are sent in the next 8 frames by base station 305 and in each case, timers T(1,4) to T(1,11) expire without receiving a response from mobile station 301. Further, counter n is incremented by 1 each time and after the expiration of timer T(1,11), counter n=10. In this example, the number of lost packets is set at N=10 and thus base station 305 ceases transmitting data to mobile station 301 and invokes the link maintenance process by sending an unsolicited RNG-RSP message to start the ranging procedure.

As seen in this example, in cases where mobile station 301 has left base station 305 due to mobility or if the link conditions degrade due to shadowing or the like, this process invokes the link maintenance mechanisms much sooner than in previous link detection systems. Further, in cases where the transmissions requiring responses are all HARQ messages, the duration to invoke the link maintenance procedures are shortened to less than one second. Existing processes to invoke link maintenance procedures may take tens of seconds. This delay in detecting poor link quality leads to base station 305 to continue to send data transmissions to mobile station 301 without mobile station 301 actually receiving them, thus wasting valuable network resources and degrading the user's experience.

Figure 6:
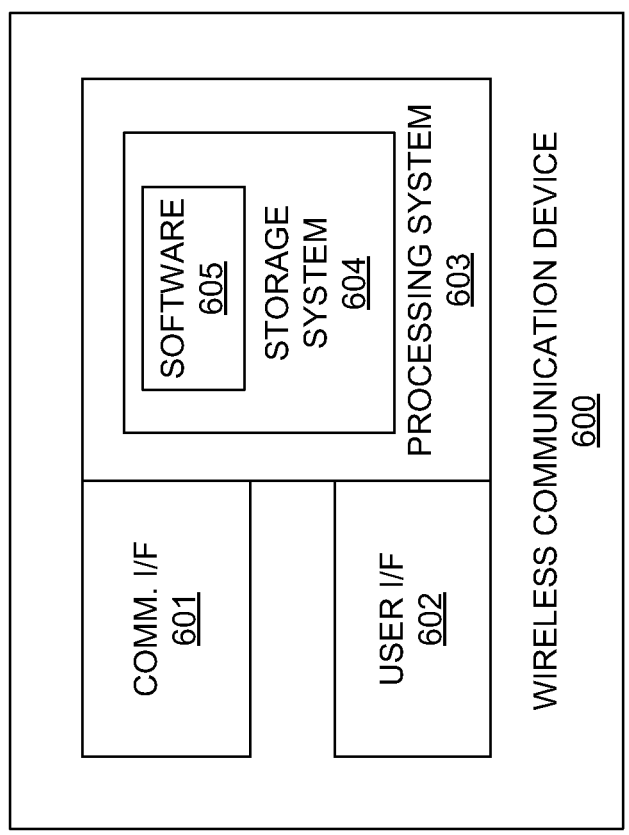
FIG. 6 is a block diagram illustrating a communication control device.

FIG. 6 illustrates communication control system 600. Communication control system 600 may be an example of one or more components of network access node 105, base stations 305 & 306, and ASN-Gateway 307, although these devices may use alternative configurations. Communication control system 600 comprises communication interface 601, user interface 602, and processing system 603. Processing system 603 is linked to communication interface 601 and user interface 602. Processing system 603 includes storage system 604 that stores software 605.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing system 603 may comprise a microprocessor and other circuitry that retrieves and executes software 605 from storage system 604. Storage system 604 may comprise a disk drive, flash drive, data storage circuitry, or some other memory apparatus. Software 605 comprises computer programs, firmware, or some other form of machine-readable processing instructions. Software 605 may include an operating system, utilities, drivers, network interfaces, applications, or some other type of software. When executed by processing system 603, software 605 directs processing system 603 to operate communication control system 600 as described with respect to FIGS. 1-5.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    initiating a communication transmission from an access node to a wireless device;
    sending a frame by the access node to the wireless device, wherein the frame comprises at least two packets and wherein each of the at least two packets require a response from the wireless device;
    initializing a counter at the access node when the frame is sent to the wireless device;
    initiating a timer for each packet of the at least two packets at the access node when the frame is sent to the wireless device;
    incrementing the counter when at least one timer expires before receiving the response associated with the at least two packets from the wireless device and resetting the timer and the counter when a response associated with a prior frame is received prior to the expiration of the at least one timer;
    performing a synchronization process between the access node and the wireless device when the counter meets a criteria, wherein the criteria is indicative of a maximum number of packets lost allotted between the access node and the wireless device and is negotiated between the access node and the wireless device; and
    stopping the communication transmission from the access node when the counter meets the criteria.

2. The method of claim 1, wherein incrementing the counter and initiating the timer only occurs when the packet requires a response from the wireless device.

3. The method of claim 1, wherein the synchronization process comprises a link maintenance process and a ranging process.

4. The method of claim 1, wherein the synchronization process comprises a random access channel (RACH) process.

5. The method of claim 1, wherein the synchronization process comprises communication in accordance with a wireless communication protocol.

6. The method of claim 5, wherein the wireless communication protocol comprises Worldwide Inter-operability for Microwave Access (WiMAX).

7. The method of claim 5, wherein the wireless communication protocol comprises Long Term Evolution (LTE).

8. The method of claim 1, wherein performing a synchronization process comprises sending an unsolicited ranging message from the access node to the wireless device after the counter meets the criteria.

9. The method of claim 1, wherein the timer for a first packet is different from a timer for a second packet.

10. A method of operating a communication system, comprising:
   initiating a communication transmission from an access node to a wireless device;
   sending a frame by the access node to the wireless device, wherein the frame comprises at least two packets and wherein the at least two packets require a response from the wireless device;
   initializing a counter at the access node when the frame is sent to the wireless device;
   initiating a timer for each packet of the frame at the access node that requires a response from the wireless device when the frame is sent to the wireless device;
   incrementing the counter when at least one timer expires before receiving the response from the wireless device;
   performing a synchronization process between the access node and the wireless device when the counter meets a criteria, wherein the criteria is indicative of a maximum number of packets lost allotted between the access node and the wireless device and is negotiated between the access node and the wireless device; and
   stopping the communication transmission from the access node when the counter meets the criteria.

11. The method of claim 10 further comprising resetting the timer and the counter when receiving a response associated with the frame prior to the expiration of the timer.

12. The method of claim 10, wherein the synchronization process comprises a link maintenance process.

13. The method of claim 10, wherein performing a synchronization process comprises sending an unsolicited ranging message from the access node to the wireless device after the counter meets the criteria.

14. The method of claim 10, wherein the timer for a first packet has a duration different from a duration of the timer for a second packet.

\* \* \* \* \*